(12) United States Patent
Choi (10) Patent No.: US 9,132,799 B1
(45) Date of Patent: Sep. 15, 2015

(54) PEDESTRIAN AIRBAG SYSTEM FOR VEHICLE

(71) Applicant: Hyundai Motor Company, Seoul (KR)

(72) Inventor: Jae Ho Choi, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/483,752

(22) Filed: Sep. 11, 2014

(30) Foreign Application Priority Data

Apr. 25, 2014 (KR) .................... 10-2014-0049825

(51) Int. Cl.
*B60K 28/10* (2006.01)
*B60R 21/36* (2011.01)
*B60R 21/34* (2011.01)

(52) U.S. Cl.
CPC ........... *B60R 21/36* (2013.01); *B60R 2021/346* (2013.01)

(58) Field of Classification Search
CPC .......................... B60R 21/36; B60R 2021/346
USPC ................ 180/274; 280/729, 743.2
See application file for complete search history.

(56) References Cited

U.S. PATENT DOCUMENTS

| | | | |
|---|---|---|---|
| 6,920,954 B2* | 7/2005 | Hashimoto et al. | 180/274 |
| 7,341,274 B2* | 3/2008 | Mori et al. | 180/274 |
| 7,584,988 B2* | 9/2009 | Okamoto et al. | 280/730.1 |
| 7,845,454 B2* | 12/2010 | Takimoto et al. | 280/730.1 |
| 8,016,066 B1* | 9/2011 | Boxey | 180/274 |
| 2006/0151228 A1* | 7/2006 | Kalliske et al. | 180/274 |
| 2006/0201731 A1* | 9/2006 | Nakamura | 180/274 |
| 2007/0023223 A1* | 2/2007 | Okamoto et al. | 180/274 |
| 2009/0000847 A1* | 1/2009 | Takimoto et al. | 180/274 |
| 2009/0120708 A1* | 5/2009 | Takimoto | 180/274 |
| 2009/0229906 A1* | 9/2009 | Takahashi et al. | 180/274 |
| 2010/0300792 A1* | 12/2010 | Yuan et al. | 180/274 |
| 2013/0200603 A1* | 8/2013 | Bergenheim et al. | 280/762 |
| 2014/0291055 A1* | 10/2014 | Tanaka et al. | 180/274 |

FOREIGN PATENT DOCUMENTS

| | | |
|---|---|---|
| JP | 2008-284935 A | 11/2008 |
| JP | 2009-101796 A | 5/2009 |
| KR | 10-2013-0012730 A | 2/2013 |
| KR | 10-2013-0100370 A | 9/2013 |

* cited by examiner

*Primary Examiner* — Paul N Dickson
*Assistant Examiner* — Robert A Coker
(74) *Attorney, Agent, or Firm* — Morgan, Lewis & Bockius LLP

(57) ABSTRACT

A pedestrian airbag system for a vehicle includes an air bag housing installed under a rear portion of a hood panel of a vehicle, an inflator disposed in a center area within the air bag housing, and an air bag cushion having a pair of chambers. which are disposed at respective sides of the inflator within the airbag housing, connected to the inflator to be supplied with gas from the inflator, and inflated to eject from the hood panel when the inflator explodes, covering A-pillars respectively, which are disposed at respective sides in the widthwise direction of a vehicle body.

8 Claims, 7 Drawing Sheets

PEDESTRIAN AIRBAG SYSTEM FOR VEHICLE

CROSS REFERENCE TO RELATED APPLICATION

The present application claims priority to Korean Patent Application No. 10-2014-0049825, filed Apr. 25, 2014, the entire contents of which is incorporated herein for all purposes by this reference.

BACKGROUND OF THE INVENTION

1. Field of the Invention

The present invention relates, in general, to an inflator and a cushion part of a pedestrian airbag module which is deployed in a vehicle, and, more particularly, to a pedestrian airbag system for a vehicle which is structured such that an inflator deploys two cushions provided for A-pillars.

2. Description of Related Art

The present invention relates to a technology regarding the structure of a pedestrian airbag module for a vehicle. A pedestrian airbag is used to effectively protect the head of a pedestrian when a vehicle collides with a pedestrian and when the head of a pedestrian is highly likely to hit the hood or cowl of a vehicle. A pedestrian airbag works in a manner that a sensor installed in a bumper detects a pedestrian and sends a detection signal, causing an airbag mounted to a lower end of the hood of a vehicle to deploy.

The purpose of a pedestrian airbag is to prevent the head of a pedestrian from directly hitting a hard area such as a cowl or a front filler of a vehicle.

Generally, a conventional pedestrian airbag is composed of a large cushion which is inflated to be entirely exposed outside a vehicle. For this reason, conventional pedestrian airbags have a problem that the cushion has a large volume and an inflator needs to have large capacity.

Aside from this, conventional pedestrian airbags need to be equipped with a pair of inflators even when protecting only an A-pillar part, which increases raw material cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pedestrian airbag for a vehicle which is structured such that one inflator deploys two A-pillar cushions.

In an aspect of the present invention, a pedestrian airbag for a vehicle may include an airbag housing installed under a rear portion of a hood panel of a vehicle, an inflator disposed in a center area within the airbag housing, and an airbag cushion including a pair of chambers which are disposed inside the airbag housing and at respective sides of the inflator, connected to the inflator so as to be supplied with gas from the inflator, and inflated to eject from the hood panel when the inflator explodes, covering A-pillars, respectively which are disposed at respective sides in the widthwise direction of a vehicle body.

The pair of chambers are disposed at side positions, respectively of the airbag cushion and a connection part is disposed between the chambers to connect the chambers to each other, and the inflator may be connected to a middle portion of the connection part to supply gas to the connection part.

The connection part and the pair of chambers may be connected to communicate with each other, forming a continuous channel.

The connection part and the pair of chambers may be made of the same fabric and unified to serve as a single cushion.

A supply pipe may be disposed inside the connection part, a middle portion of the supply pipe may be connected to the inflator so that the supply pipe is supplied with gas from the inflator, and the chambers may be supplied with gas through respective ends of the supply pipe.

The connection part may have a pipe shape that connects the chambers to each other, the connection part may be supplied with gas by being connected to the inflator at a middle portion thereof, and the gas may be then supplied to the chambers through respective ends of the connection part.

The chambers may have an elongated shape and extend along the corresponding A-pillars, respectively, the chambers may be disposed in side portions within the airbag housing when folded, the connection part may connect the chambers to each other while the connection part is disposed within the airbag housing, the inflator may be disposed in a center area within the airbag housing, and the inflator may be connected to a middle portion of the connection part.

An inside of each chamber may be provided with barriers extending in a longitudinal direction and the inside of each chamber may be divided into a plurality of channels, which extend in the longitudinal direction, by the barriers In another aspect of the present invention, a pedestrian airbag system for a vehicle may include an airbag housing installed under a rear portion of a hood panel of a vehicle, an inflator disposed in a center area within the airbag housing, an air cushion including a pair of chambers which are disposed at respective sides of the inflator and within the airbag housing, connected to the inflator so as to be supplied with gas from the inflator, and inflated to eject from the hood panel when the inflator explodes, covering A-pillars at sides of a vehicle body, respectively, and an external tether with a first end connected to the chamber and a second end fixed to any one of the air bag housing, the hood panel, and the vehicle body, the external tether pulling inward the chamber when the chamber is deployed in order to prevent the chamber from getting apart from the vehicle body.

In another aspect of the present invention, a pedestrian airbag system for a vehicle may include an airbag housing installed under a rear portion of a hood panel of a vehicle, an inflator disposed in a center area within the air bag housing, an airbag cushion including a pair of chambers and a connection part connecting the chambers to each other, the chambers being disposed on respective sides of the inflator and within the airbag housing, connected to the inflator so as to be supplied with gas from the inflator, and inflated to eject from the hood panel when the inflator explodes, covering A-pillars at respective sides of a vehicle body, respectively, in which the inflator is connected to a middle portion of the connection part so that gas is supplied to the connection part; and an external tether with a first end connected to the chamber and a second end fixed to any one of the airbag housing, the hood panel, the connection part, and the vehicle body, the external tether pulling inward the chambers when the chambers are deployed in order to prevent the chambers from getting apart from the vehicle body.

There may be two external tethers corresponding to the chambers, respectively, upper ends of the external tethers may be connected to the corresponding chambers, respectively, lower ends of the external tethers may extend to approach each other and fixed to any one of the airbag housing, the hood panel, the connection part, and the vehicle body; and the pair of external tethers may take a V-shape.

The pedestrian airbag system for a vehicle according to the present invention has an advantage of simultaneously deploying two side chambers using one inflator, which reduces the number of inflators used compared with conventional airbag systems, resulting in a decrease in the volume of the pedestrian airbag.

In addition, since the shape of the cushions deployed in an A-pillar part is stably maintained, the pedestrian airbag system for a vehicle has improved reliability.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings include reference to the following elements as further discussed below.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings so that those skilled in the Field of the Invention to which the present invention pertains may carry out the exemplary embodiment.

Figure 1:
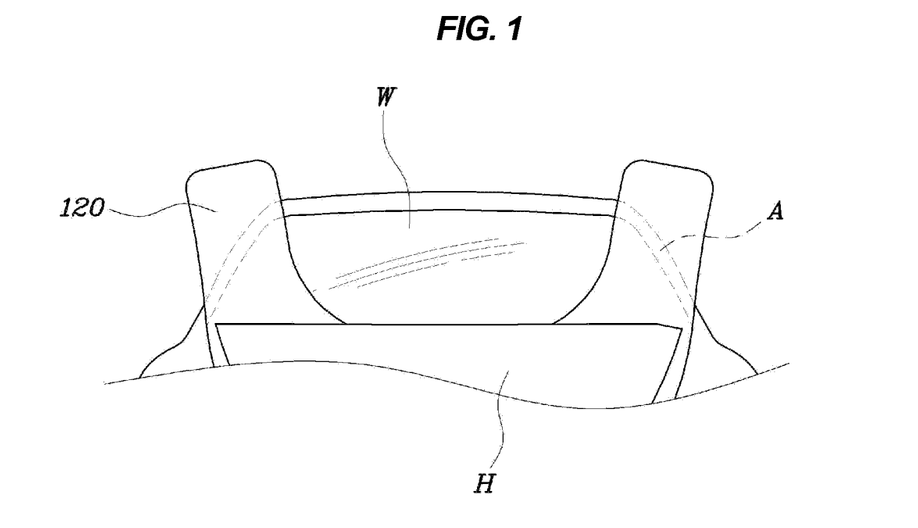
FIG. 1 is a view illustrating a deployed state of a pedestrian airbag system for a vehicle according to various exemplary embodiments of the present invention.
Figure 2A:
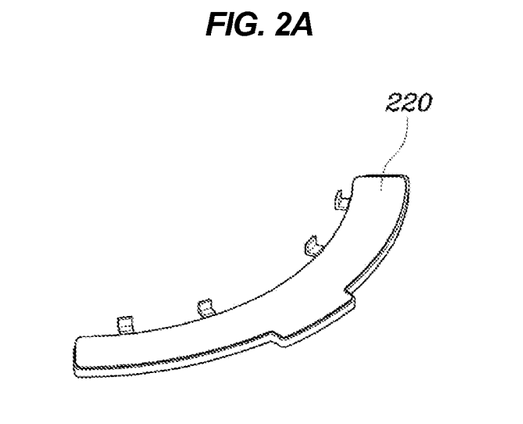
FIG. 2A is an exploded perspective view illustrating the pedestrian airbag system for the vehicle according to various exemplary embodiments of the present invention.
Figure 2B:
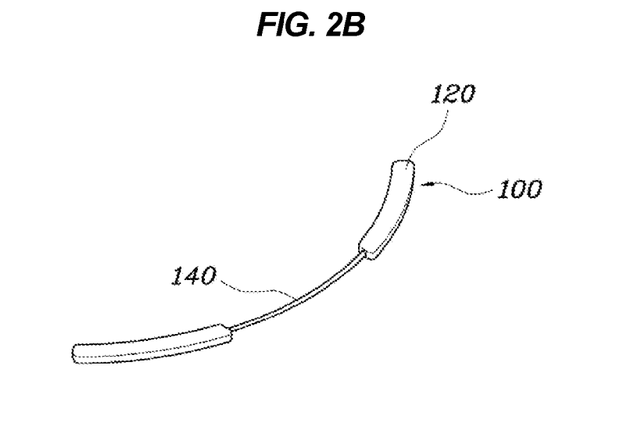
FIG. 2B is an exploded perspective view illustrating the pedestrian airbag system for the vehicle according to various exemplary embodiments of the present invention.
Figure 2C:
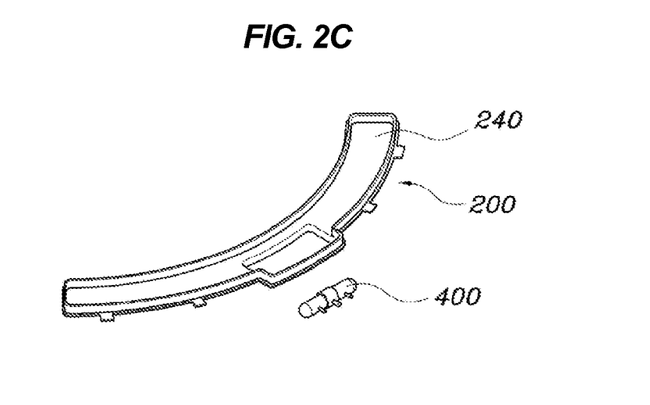
FIG. 2C is an exploded perspective view illustrating the pedestrian airbag system for the vehicle according to various exemplary embodiments of the present invention.
Figure 6:
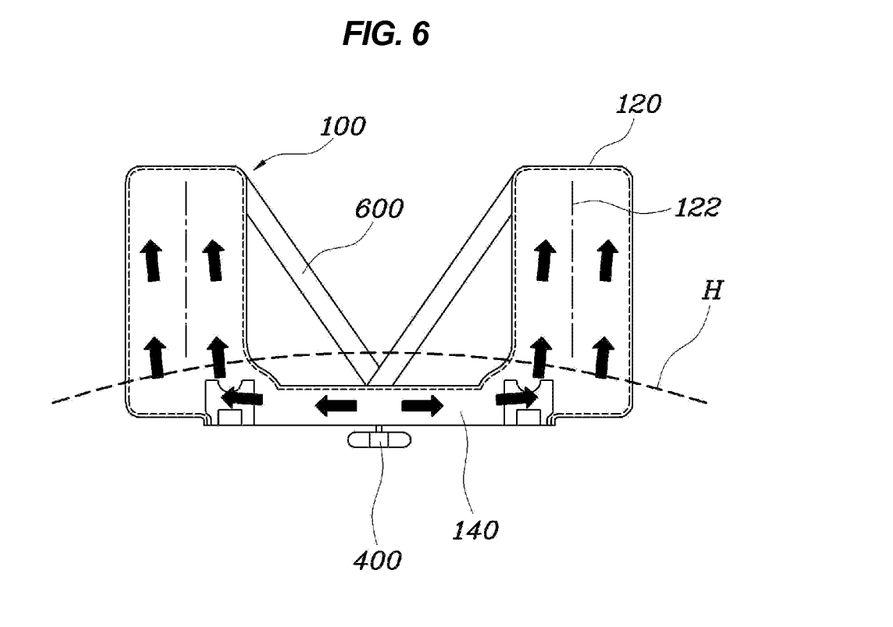
FIG. 6 is a view illustrating the pedestrian airbag systems for the vehicle according to various exemplary embodiments of the present invention.
Figure 7:
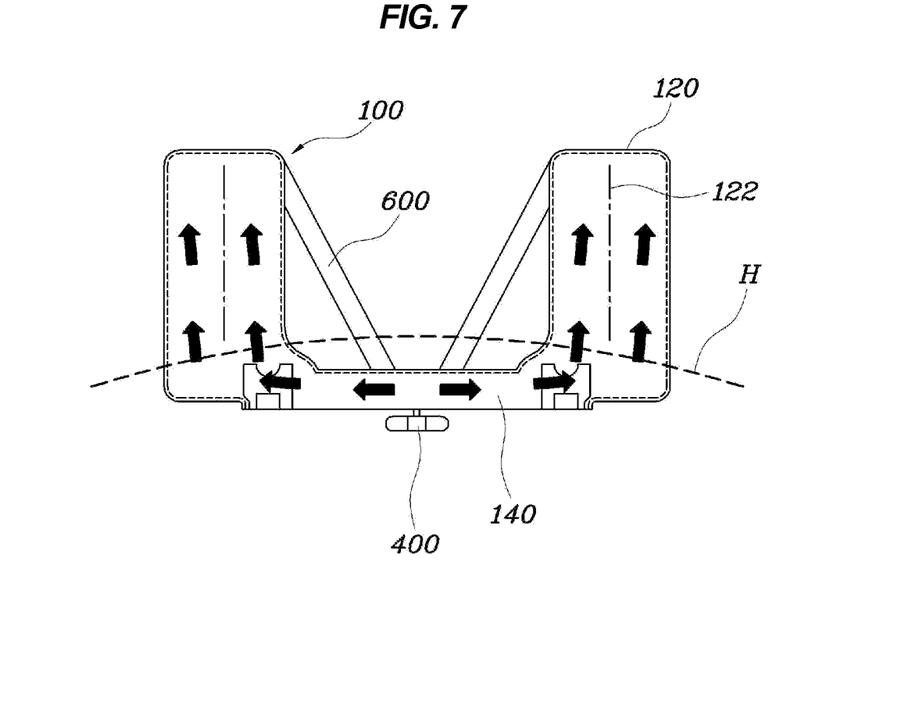
FIG. 7 is a view illustrating the pedestrian airbag systems for the vehicle according to various exemplary embodiments of the present invention.
Figure 8:
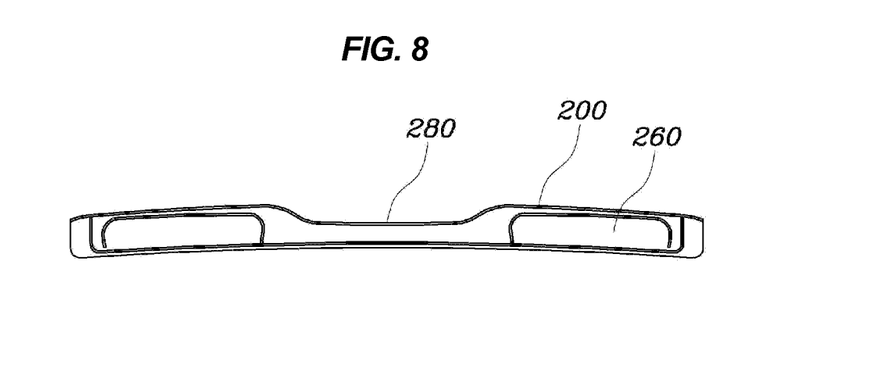
FIG. 8 is a view illustrating an airbag housing of a pedestrian airbag system for a vehicle according to various exemplary embodiments of the present invention.

FIG. 1 is a view illustrating a deployed state of a pedestrian airbag system for a vehicle according to a first embodiment; FIGS. 2A-2C are exploded perspective views illustrating the pedestrian airbag system for the vehicle according to the first embodiment; FIGS. 3 to 7 are views illustrating pedestrian airbag systems for a vehicle according to various exemplary embodiments; and FIG. 8 is a view illustrating an airbag housing of a pedestrian airbag system for a vehicle according to any one of the exemplary embodiments of the present invention.

The pedestrian airbag system for a vehicle according to the embodiment of the present invention includes an airbag housing 200 mounted under a rear portion of a hood panel H of a vehicle, an inflator 400 disposed in a center portion inside the airbag housing 200, and an airbag cushion 100 including a pair of chambers 120, which are disposed on respective sides of the inflator 400 and within the airbag housing 200, supplied with gas by being connected to the inflator 400, and inflated to eject from the hood panel H when the inflator 400 explodes, covering A-pillars A, respectively.

FIG. 1 illustrates a deployed state of the pedestrian airbag system for a vehicle according to the first present embodiment. When a vehicle hits a pedestrian, the hood panel H is lifted and the pair of chambers 120 are deployed to eject from the underside of the rear end of the hood panel H. The chambers 120 are deployed from respective sides of the hood panel H, covering the A-pillars A, respectively. Accordingly, it is possible to prevent the head of the pedestrian from directly hitting the A-pillar A, thereby preventing injuries of the pedestrian.

Specifically, FIGS. 2A-2C are exploded perspective views of the pedestrian airbag system according to the first embodiment. With reference to FIGS. 2A-2C, the airbag housing 200 is installed under the rear portion of the hood panel H. The airbag housing 200 is directly attached to a lower surface of the hood panel H or installed within a cowl.

There is only one inflator 400, and the inflator 400 is installed in a center portion inside the airbag housing 200. Upon receiving a deployment signal, the inflator 400 explodes and generates gas. The pair of chambers 120 are disposed within the airbag housing 200. The chambers 120 are disposed on both sides of the inflator 400 and are connected to the inflator 400 so that the chambers 120 can be supplied with gas from the inflator 400. When the inflator 400 explodes, the chambers 120 inflate to eject from the hood panel H and to cover the A-pillars A.

Figure 3:
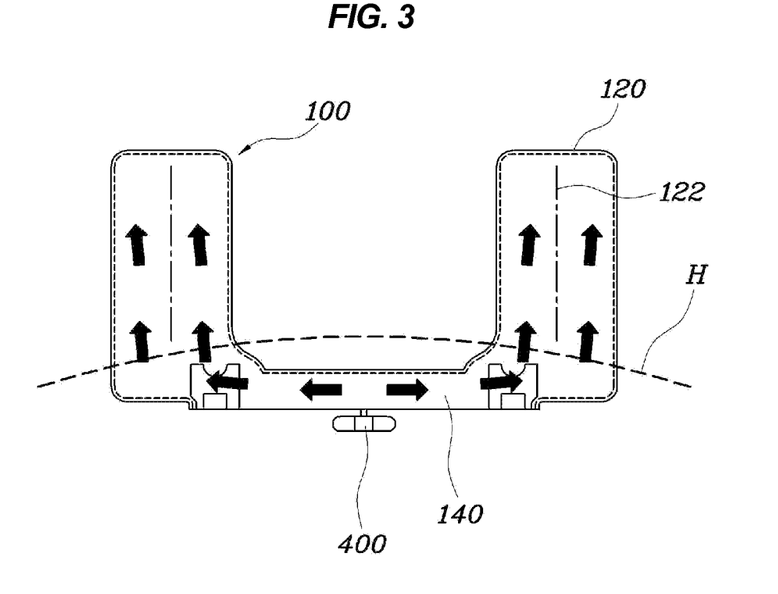
FIG. 3 is a view illustrating the pedestrian airbag systems for the vehicle according to various exemplary embodiments of the present invention.

Specifically, as illustrated in FIG. 3, an airbag cushion 100 is made up of the pair of chambers 120, and a connection part 140 connecting the chambers 120 to each other. The inflator 400 is connected to a middle portion of the connection part 140 in order to supply gas to the connection part 140.

That is, the cushion 100 includes the chambers 120 and the connection part 140 connecting the chambers 120 to each other, the connection part 140 is supplied with gas from the inflator 400 and transfers the gas to the chambers 120, and the chambers 120 are inflated by the supplied gas.

With this structure, it is possible to inflate two chambers 120 using only one inflator 400. Furthermore, since the chambers 120 are inflated at positions corresponding to the A-pillars A, respectively, the volume of the cushion 100 is decreased, and the number and capacity of the inflator 400 are also decreased.

In addition, since the connection part 140 functions only as a connector to connect the chambers 120 to each other, the airbag housing 200 takes up a small space. Accordingly, the structure of the pedestrian airbag system for a vehicle is advantageous in terms of packaging. FIG. 8 is a view illustrating an airbag housing 200 of a pedestrian airbag system for a vehicle according to another exemplary embodiment. With reference to FIG. 8, doors 260 are disposed in the front surface of the airbag housing 200, and the doors 260 tear open when the chambers 120 inflate. Since the chambers 120 are disposed in respective side portions within the airbag housing 120, a pair of doors 260 is provided to correspond to the chambers 120. Since the volume of a middle portion 280 of the airbag housing 200 is decreased, the airbag housing 200 may not interfere with other parts of a vehicle.

As illustrated in FIG. 3, the connection part 140 and the pair of chambers 120 are connected to communicate with each other, forming a gas circulation channel. The connection part 140 and the pair of chambers 120 are made of the same fabric to form one cushion. In this case, since the chambers 120 and the connection parts 140 are unified to serve as one cushion, manufacturing is easy and raw material cost can be reduced. Furthermore, the process of connecting the chambers 120 to the connection part 140 can be eliminated.

Even in this case, the connection part 140 does not appear from the outside when the cushion 100 is developed as it is concealed behind a rear end portion of the hood, but only the chambers 120 are inflated to eject from the hood and to cover the A-pillars A, respectively.

Figure 4:
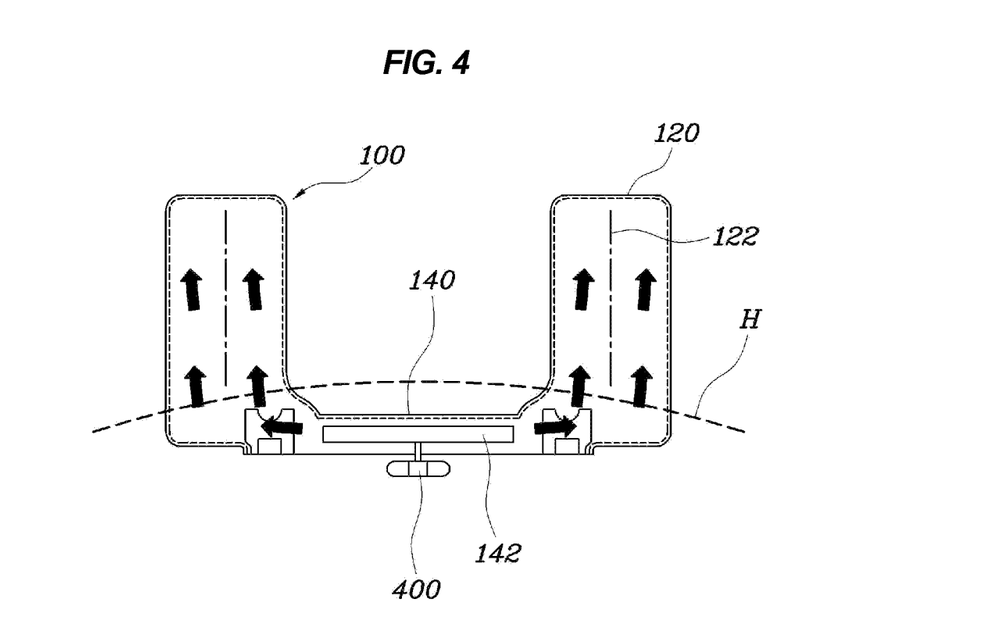
FIG. 4 is a view illustrating the pedestrian airbag systems for the vehicle according to various exemplary embodiments of the present invention.

As illustrated in FIG. 4, a supply pipe 142 is embedded in the connection part 140. A middle portion of the supply pipe 142 is connected to the inflator 400 so that gas is first supplied to the supply pipe 142 and then to the chambers 120 through respective ends of the supply pipe 142. In this case, the supply pipe 142 is separately prepared and then installed within the connection part 140. With this structure, gas is supplied to the chambers 120 earlier than it is supplied the connection part 140 so that the chambers 120 rapidly deploy. In addition, after the chambers 120 are inflated, the connection part 140 is inflated later. Accordingly, the supply pipe 142 can be protected from external impact.

Figure 5:
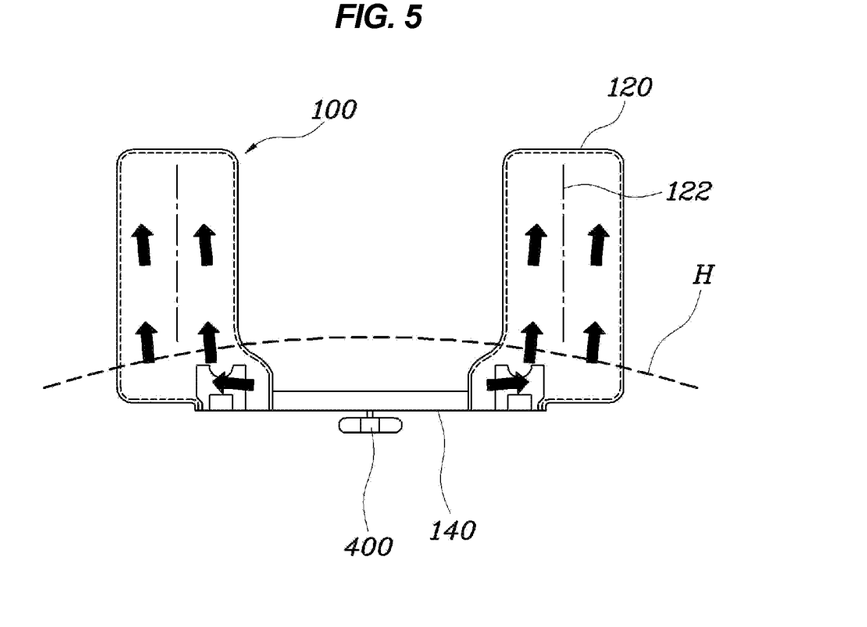
FIG. 5 is a view illustrating the pedestrian airbag systems for the vehicle according to various exemplary embodiments of the present invention.

Alternatively, as illustrated in FIG. 5, the connection part 140 may have a pipe shape that connects the chambers 120 to each other. A middle portion of the connection part 140 is connected to the inflator 400 so that it is supplied with gas from the inflator 400. The gas supplied to the middle portion of the connection part 140 subsequently flows to the chambers through respective ends of the connection part 140. The connection part 140 may be a steel pipe. In this case, the connection part 140 is not inflated but the chambers 120 are inflated. This structure can save unnecessary space which will be taken-up by an inflated connection part, and also reduce the amount of gas needed to inflate an airbag.

Each chamber 120 has a shape which extends along the corresponding A-pillar A. The chambers 120 are disposed within respective side portions of the airbag housing 200, when they are deployed. The connection part 140 connects the chambers 120 to each other and is also disposed inside the airbag housing 200. The inflator 400 is disposed in a center portion inside the airbag housing 200, and the inflator 400 and a middle portion of the connection part 140 may be connected to each other.

The inside of each chamber 120 may be provided with barriers 122 which extend along the longitudinal direction of the chamber 120. The inside of the chamber 120 is divided into a plurality of channels by the barriers 122. This structure prevents each chamber 120 from shaking in left and right directions when a vehicle moves after the chambers 120 are inflated or when a vehicle collides with a pedestrian, and makes the chambers 120 stay close to the A-pillars A, respectively. The channels defined by the barriers 122 extend in the longitudinal direction so that the chambers 120 may not move sideways.

A pedestrian airbag system for a vehicle according to a second exemplary embodiment includes an airbag housing 200 installed under a rear portion of a hood panel H of a vehicle, an inflator 400 disposed in a center portion within the airbag housing 200, an airbag cushion 100 including a pair of chambers 120 which are disposed at respective sides of the inflator 400, respectively within the airbag housing 200, supplied with gas by being connected to the inflator 400, and inflated to eject from the hood panel H when the inflator 400 explodes, covering A-pillars, A, disposed at sides of a vehicle, respectively, and an external tether 600 which is connected to the chamber 120 at a first end thereof and fixed to any one of the airbag housing 200, the hood panel H, and a vehicle body at a second end thereof. With this structure, the external tether 600 pulls inward the chambers 120 in order to prevent the chambers 120 from getting apart from the body of a vehicle when the chambers 120 are deployed.

A pedestrian airbag system for a vehicle according to a third exemplary embodiment includes an airbag housing 200 installed under a rear portion of a hood panel H of a vehicle, an inflator 400 disposed in a center area within the airbag housing 200, an airbag cushion 100 including a pair of chambers 120 and a connection part 140 connecting the chambers 120 to each other, the chambers 120 being disposed at respective sides of the inflator 400 and within the airbag housing 200, being supplied with gas by being connected to the inflator 400, and being inflated to eject from the hood panel H when the inflator 400 explodes, thereby covering A-pillars, A, respectively, and an external tether 600 which is connected to the chamber 120 at a first end thereof and fixed to any one of the hood panel H, the connection part 140, and a vehicle body at a second end thereof. The external tether 600 pulls inward the chambers 120 in order to prevent the chambers 120 from getting apart from the body of a vehicle when the chambers 120 are deployed.

There may be a pair of external tethers 600 corresponding to the chambers 120, respectively. Upper ends of the external tethers 600 are connected to the corresponding chambers 120, respectively. Lower ends of the external tethers 600 approach each other and are connected to any one of the airbag housing 200, the hood panel H, and the connection part 140. That is, the pair of external tethers 600 takes the form of letter "V".

FIGS. 6 and 7 are views illustrating the structure of the external tethers 600. The upper ends of the external tethers 600 are connected to the upper ends of the chambers 120 facing the external tethers 600, and the lower ends of the external tethers 600 may be fixed to the body of a vehicle. This arrangement prevents the chambers 120 from excessively stretching outward, thereby preventing the chambers 120 from getting apart from the body of a vehicle. When the chambers 120 are deployed, since the chambers 120 are deployed in the directions in which a gap between the chambers 120 broadens, the external tethers 600 restricts this broadening. The effect of restricting the broadening of a gap between the chambers 120 can be achieved when lower ends of the pair of external tethers 600 are fixed to any one of the airbag housing 200 which is a fixed structure, the hood panel H, the connection part 140, and the body of a vehicle. The external tethers 600 are arranged in the form of letter "V" in which the lower ends stay close to each other. This arrangement prevents upper ends of the chambers 120 from moving excessively apart from each other, thereby preventing the chambers 120 from moving apart from the body of a vehicle.

According to the pedestrian airbag system for a vehicle having the structure described above, since chambers disposed at respective sides of a vehicle body can be simultaneously deployed by one inflator, it is possible to reduce the number of inflators, and the capacity of the inflator.

In addition, since the shape of the cushions deployed near the A-pillars is stably secured, reliability of an airbag is improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pedestrian airbag system for a vehicle, comprising:
   an airbag housing installed under a rear portion of a hood panel of the vehicle;
   an inflator disposed in a center area within the airbag housing; and
   an airbag cushion including a pair of chambers which are disposed inside the airbag housing and at respective sides of the inflator,
   wherein the pair of chambers are connected to the inflator to be supplied with gas from the inflator, and inflated to eject from the hood panel when the inflator explodes, covering A-pillars, respectively which are disposed at respective sides in a widthwise direction of a vehicle body,
   wherein the pair of chambers are disposed at side positions, respectively of the airbag cushion and a connection part is disposed between the chambers to connect the chambers to each other,
   wherein the inflator is connected to a middle portion of the connection part to supply gas to the connection part, and
   wherein the connection part has a pipe shape that connects the chambers to each other, the connection part is not inflated while the chambers are inflated, the connection part is supplied with gas by being connected to the inflator at a middle portion thereof, and the gas is then supplied to the chambers through respective ends of the connection part.

2. The pedestrian airbag system of claim 1, wherein the connection part and the pair of chambers are connected to communicate with each other, forming a continuous channel.

3. The pedestrian airbag system of claim 1,
   wherein the chambers have an elongated shape and extend along corresponding A-pillars, respectively, the chambers are disposed in side portions within the airbag housing when folded, the connection part connects the chambers to each other while the connection part is disposed within the airbag housing, the inflator is disposed in a center area within the airbag housing, and the inflator is connected to the middle portion of the connection part.

4. The pedestrian airbag system of claim 1, wherein an inside of each chamber is provided with barriers extending in a longitudinal direction thereof and the inside of each chamber is divided into a plurality of channels, which extend in the longitudinal direction, by the barriers.

5. A pedestrian airbag system for a vehicle, comprising:
   an airbag housing installed under a rear portion of a hood panel of the vehicle;
   an inflator disposed in a center area within the airbag housing;
   an air cushion including a pair of chambers which are disposed at respective sides of the inflator and within the airbag housing,
   wherein the pair of chambers are connected to the inflator to be supplied with gas from the inflator, and inflated to eject from the hood panel when the inflator explodes, covering A-pillars at sides of a vehicle body, respectively; and
   an external tether with a first end connected to a chamber and a second end fixed to any one of the air bag housing, the hood panel, and the vehicle body, the external tether pulling inward the chamber when the chamber is deployed in order to prevent the chamber from getting apart from the vehicle body,
   wherein the pair of chambers are disposed at side positions, respectively of the airbag cushion and a connection part is disposed between the chambers to connect the chambers to each other,
   wherein the inflator is connected to a middle portion of the connection part to supply gas to the connection part, and
   wherein the connection part has a pipe shape that connects the chambers to each other, the connection part is not inflated while the chambers are inflated, the connection part is supplied with gas by being connected to the inflator at a middle portion thereof, and the gas is then supplied to the chambers through respective ends of the connection part.

6. The pedestrian airbag system of claim 5, wherein there are two external tethers corresponding to the pair of chambers, respectively, upper ends of the external tethers are connected to the corresponding chambers, respectively, wherein lower ends of the external tethers extend to approach each other and are fixed to any one of the airbag housing, the hood panel, the connection part, and the vehicle body, and wherein the two external tethers take a V-shape.

7. A pedestrian airbag system for a vehicle, comprising:

an airbag housing installed under a rear portion of a hood panel of the vehicle;

an inflator disposed in a center area within the airbag housing;

an airbag cushion including a pair of chambers and a connection part connecting the chambers to each other, the chambers being disposed on respective sides of the inflator and within the airbag housing, connected to the inflator to be supplied with gas from the inflator, and inflated to eject from the hood panel when the inflator explodes, covering A-pillars at respective sides of a vehicle body, respectively, wherein the inflator is connected to a middle portion of the connection part so that gas is supplied to the connection part; and an external tether with a first end connected to a chamber and a second end fixed to any one of the airbag housing, the hood panel, the connection part, and the vehicle body, the external tether pulling inward the chamber when the chamber is deployed in order to prevent the chamber from getting apart from the vehicle body, wherein the pair of chambers are disposed at side positions, respectively of the airbag cushion and a connection part is disposed between the chambers to connect the chambers to each other, and wherein the inflator is connected to a middle portion of the connection part to supply gas to the connection part, wherein the connection part has a pipe shape that connects the chambers to each other, the connection part is not inflated while the chambers are inflated, the connection part is supplied with gas by being connected to the inflator at a middle portion thereof, and the gas is then supplied to the chambers through respective ends of the connection part.

8. The pedestrian airbag system of claim 7, wherein there are two external tethers, each corresponding to each individual chamber of the pair of chambers, respectively, wherein each of upper ends of the external tethers is connected to each corresponding individual chamber, respectively, lower ends of the external tethers extend to approach each other and are fixed to any one of the airbag housing, the hood panel, the connection part, and the vehicle body, and wherein the two external tethers take a V-shape.

* * * * *